United States Patent [19]

Poole

[11] Patent Number: 4,946,041

[45] Date of Patent: Aug. 7, 1990

[54] EASY OPENING GABLE TOP CARTON

[75] Inventor: Donald A. Poole, Greenfield Park, Canada

[73] Assignee: FBI Brands Ltd., Canada

[21] Appl. No.: 261,325

[22] Filed: Oct. 24, 1988

[30] Foreign Application Priority Data

Mar. 11, 1988 [CA] Canada .................................. 561,264

[51] Int. Cl.⁵ .............................................. B65D 5/70
[52] U.S. Cl. .............................. 236/621.1; 229/125.42
[58] Field of Search ......................... 229/3.1, 125.42; 206/621.1, 621.2, 631.3

[56] References Cited

U.S. PATENT DOCUMENTS

| | | | |
|---|---|---|---|
| Re. 26,305 | 11/1967 | Huang | 206/631.3 |
| Re. 29,074 | 12/1976 | MacEwen . | |
| 2,726,583 | 12/1955 | Barnes et al. . | |
| 3,071,305 | 1/1963 | Zinn . | |
| 3,116,002 | 12/1963 | Crawford et al. | 206/631.3 |
| 3,167,231 | 1/1965 | Bray | 206/621.2 |
| 3,200,557 | 8/1965 | Schwenk . | |
| 3,220,161 | 11/1965 | Lohse et al. . | |
| 3,302,846 | 3/1967 | Wilcox | 206/631.3 |
| 3,334,799 | 8/1967 | Crawford . | |
| 3,370,399 | 2/1968 | Egleston . | |
| 3,392,458 | 7/1968 | Braun . | |
| 3,468,731 | 9/1969 | Obeda . | |
| 3,471,076 | 10/1969 | Crawford | 206/631.3 |
| 3,488,244 | 1/1970 | Lepisto . | |
| 3,543,993 | 12/1970 | Rausing | 206/621.2 X |
| 3,550,833 | 12/1970 | Rahenkamp | 229/17 |
| 3,765,144 | 10/1973 | Schlesser . | |
| 3,788,917 | 1/1974 | Linda . | |
| 3,825,408 | 7/1974 | Farfaglia et al. . | |
| 3,889,449 | 6/1975 | Membrino . | |
| 3,890,765 | 6/1975 | Farfaglia et al. . | |
| 3,956,046 | 5/1976 | Tsuchiya et al. . | |
| 3,956,975 | 5/1976 | Egleston et al. . | |
| 4,078,364 | 3/1978 | Schmidt . | |
| 4,079,570 | 3/1978 | Rucker . | |
| 4,124,220 | 11/1978 | Schwarzkopf . | |
| 4,159,220 | 6/1979 | Bosche et al. . | |
| 4,206,867 | 6/1980 | Skjelby . | |
| 4,313,553 | 2/1982 | Lisiecki | 229/17 G |
| 4,403,465 | 9/1983 | Bachner . | |
| 4,442,970 | 4/1984 | Fe,uml/a/ rber | 206/631.3 X |
| 4,558,122 | 5/1986 | Lisiecki | 229/17 R |
| 4,628,669 | 12/1986 | Herron et al. . | |
| 4,684,058 | 8/1987 | Weber . | |
| 4,712,727 | 12/1987 | Wyberg . | |
| 4,744,467 | 5/1988 | Jönsson et al. | 206/631.3 |
| 4,756,426 | 7/1988 | Wyberg . | |
| 4,762,234 | 8/1988 | Wyberg . | |
| 4,775,096 | 10/1988 | Andersson et al. | 206/631.3 X |
| 4,792,048 | 12/1988 | Wyberg . | |
| 4,813,557 | 3/1989 | Herron et al. . | |

FOREIGN PATENT DOCUMENTS

| | | | |
|---|---|---|---|
| 753099 | 2/1967 | Canada | 190/1 |
| 906969 | 8/1972 | Canada | 229/19.2 |
| 1083086 | 8/1980 | Canada | 210/22 |
| 1194847 | 9/1985 | Canada | 229/19.2 |
| 0159302 | 10/1985 | European Pat. Off. . | |
| 0185325 | 6/1986 | European Pat. Off. . | |
| 0222511 | 5/1987 | European Pat. Off. . | |
| 1152428 | 2/1958 | France . | |
| 8204025 | 11/1982 | Int'l Pat. Institute | 206/631.3 |
| 8204025 | 11/1982 | PCT Int'l Appl. . | |
| 1215963 | 12/1970 | United Kingdom . | |

OTHER PUBLICATIONS

"Engineering Considerations in Retort Processing of Flexible Packages," *Food Technology*, Aug. 1972, pp. 65–68, by R. B. Davis, F. E. Long, and W. F. Robertson.

*Primary Examiner*—Stephen Marcus
*Attorney, Agent, or Firm*—Arnold, White & Durkee

[57] ABSTRACT

This invention addresses the problem of providing a gable top carton having a secure seal, but which can easily be opened. The gable top carton is of the type having a gable closure including side flaps and end flaps extending to a lower height than the side flaps. Opening of the carton is facilitated by providing an area that is not firmly adhered at the center of the upper portion of an end flap. Security of the seal in spite of the unsealed area is achieved using a stake point immediately below the area that is not firmly adhered. Sealing dies to achieve the foregoing are described.

11 Claims, 3 Drawing Sheets

1

EASY OPENING GABLE TOP CARTON

FIELD OF THE INVENTION

This invention relates to a gable top carton of improved construction.

BACKGROUND OF THE INVENTION

Gable top cartons are commonly used for packaging liquid food products such as milk, juices, citrus products and vegetable cocktails. When the product is to be refrigerated, such as in the case of milk, the integrity of the seal is not critical. It is desirable to avoid spillage, but because of the short shelf life and refrigeration of the milk there should not be a practical problem due to spoilage as a result of contaminants entering the carton. It is therefore possible to provide a closure that can be opened without too much difficulty by the consumer.

When the product to be packaged is another product such as orange juice or vegetable juice, it is desirable that it have adequate shelf life without the necessity of refrigeration. If the seal is inadequate, bacteria, molds and yeast may contaminate the product and cause spoilage. Also, if air enters the container it may cause oxidation. It is therefore necessary to provide an extremely strong seal. The entire top is heat sealed, according to present practice, and is also impressed with vertical stake lines, a horizontal stake line, and a central stake point. The result is, however, that the container is not an easy opening carton from the point of view of the average consumer. This defeats one of the main purposes of having a gable top container. Various expedients have been used to try to solve this problem including a weakened severance line, but this has not proven to be entirely satisfactory.

OBJECTS AND SUMMARY OF THE INVENTION

The object of this invention is therefore to provide a gable top carton having a secure seal, but which can easily be opened.

This is achieved according to this invention by providing a gable top carton, the gable closure of which includes opposed side panels with side flaps extending therefrom and opposed end panels with end flaps extending therefrom to a lower height than the flaps of the side panels, said side panels and an end panel having score lines to facilitate closing and opening, the opposed side flaps being adhered to each other and the end flaps being adhered to the lower portions of the side flaps, characterized in that an area that is not firmly adhered is left at the center of the upper portion of an end flap to facilitate opening of the carton by a consumer, there being a stake point immediately below the area that is not firmly adhered.

BRIEF DESCRIPTION OF THE DRAWINGS

In the drawings which illustrate the preferred embodiment of this invention.

Figures 1, 2:
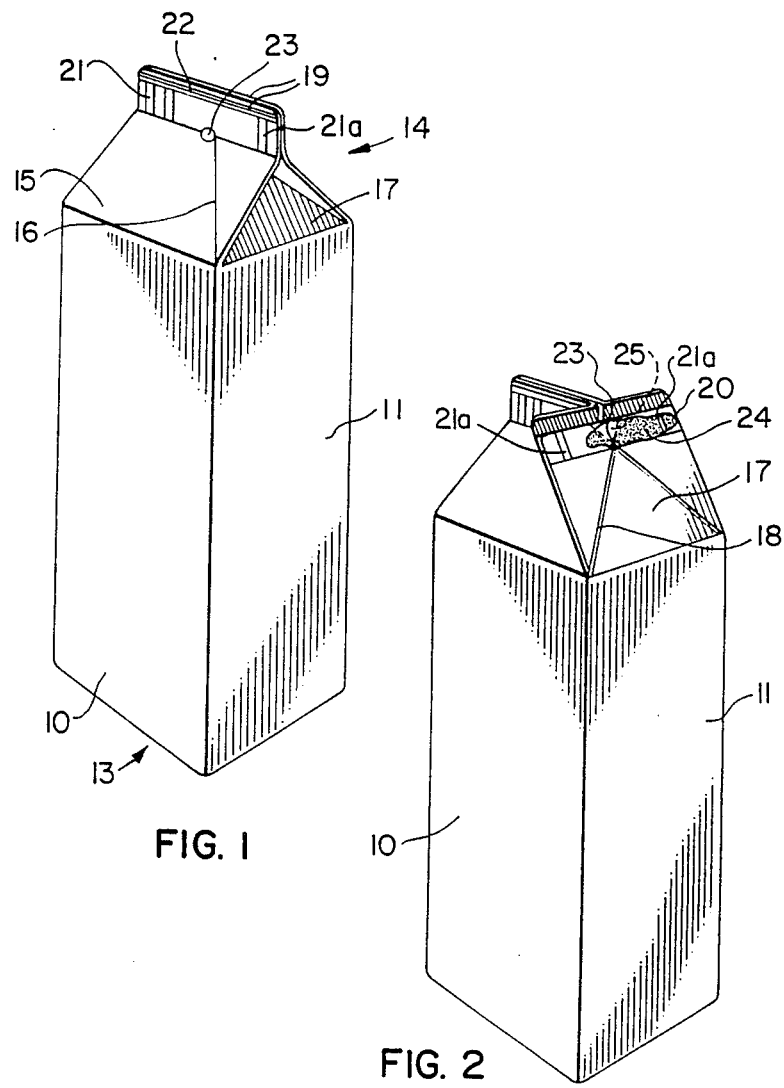
FIG. 1 is a perspective view of a gable top container in accordance with this invention.
FIG. 2 is a perspective view illustrating the opening of the carton shown in FIG. 1, with part broken away.

Referring now to the drawings, the carton illustrated is mainly of conventional construction. It includes opposed pairs of side walls 10 and end walls 1!, connected by a fifth panel 12 (shown in FIG. 3). There is a bottom closure generally indicated at 13 and a gable top generally indicated at 14. The gable top includes a pair of side panels 15 having score lines 16 to facilitate opening one end and a pair of end panels 17 having score lines 18. A pair of top flaps 19 are extensions of the side panels 15 and extend somewhat higher than the flaps 20 that are an extension of the end panels 17. The flaps 19 are heat sealed in a face to face relationship as shown in FIG. 1. The flaps 20 and 20a are heat sealed to the interior of the lower parts of the flaps 19 as shown in FIG. 2. It is usual to provide a pair of stake lines 21 at the end of the flaps 19 that is not to be opened and which coincides with the fifth panel 12. At the other end of the flap 19 that is to be opened there is a stake line 21a. There is also a horizontal stake line 22 extending the full length of the side flaps 19 and being located at the top of the end flaps 20 that have been folded within the side flaps. The stake lines are strongly indented to give a more secure seal. There is also a stake point 23 which presses together, expands into abutment and seals the adjacent edges of the inwardly folded end flaps 20 and 20a. The foregoing is conventional structure.

DETAILED DESCRIPTION OF THE PREFERRED EMBODIMENTS

Figure 3:
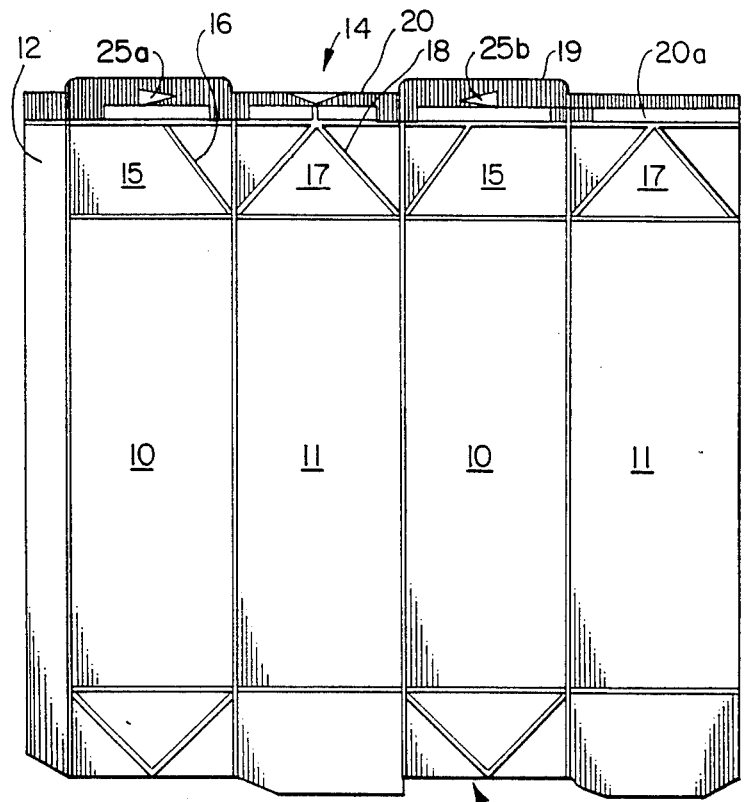
FIG. 3 illustrates the carton of FIG. 1 that has been opened up to show the areas that have been heat sealed.

The difference from conventional structure according to this invention is in the area of the seal between flaps 19 and 20, at the end of the closure that is to be opened. According to conventional practice, in the case of hot fill, the whole of the interior of the flap 20 is sealed to the flaps 19. According to this invention an area which may be in the shape of an inverted triangle is left unsealed at the top centre of the flap 20 as indicated by the numeral 25 in the broken away part of FIG. 2. The remaining sealed area is stippled and indicated at 24. In FIG. 3 the unsealed area is shown at 25a and 25b which combine to provide an area 25 when the carton is closed. It has been found that when there is the location of the stake point 23 at the apex of the triangle 25, an effective seal is provided in spite of this unsealed area. The unsealed area at the top centre enables the consumer to start opening the carton and also results in there being less seal to pull apart where the consumer has the least leverage.

Figure 4:
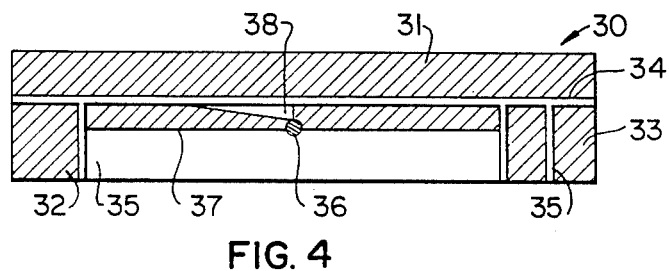
FIG. 4 is an elevation view of a die that may be used for heat sealing the carton of FIGS. 1 to 3.

FIG. 4 illustrates the male jaw of a suitable die 30 including: a die face portion 31 for pressing together the upper part of the flaps 19, die face portions 32 and 33 for the ends and horizontal stake embossing the line 34, vertical stake embossing the lines 35 and an embossing protrusion 36 for the stake point. A die face portion 37, which presses flaps 19 and 20 together to connect them, is cut away at 38 to leave a triangular unsealed area. The die 30 can be used with a matching female die.

Alternatives for providing the desired unsealed area include the use of silicone as a parting agent to prevent adhesion in area 25. Another possibility, if adhesive were used in place of heat sealing, would be to omit adhesive in area 25. Heat sealing is, however, the preferred method of closure when the carton is coated with a thermoplastic resin. The preferred structural material is in five layers, including: an inner coating of polyethylene, a foil barrier, a layer of polyethylene to bond the foil, a layer of paper board and an outer layer of polyethylene. Other thermoplastic coatings could be used of the type acceptable with food products, such as vinyl resins (e.g., polyvinyl chloride).

Figure 5:
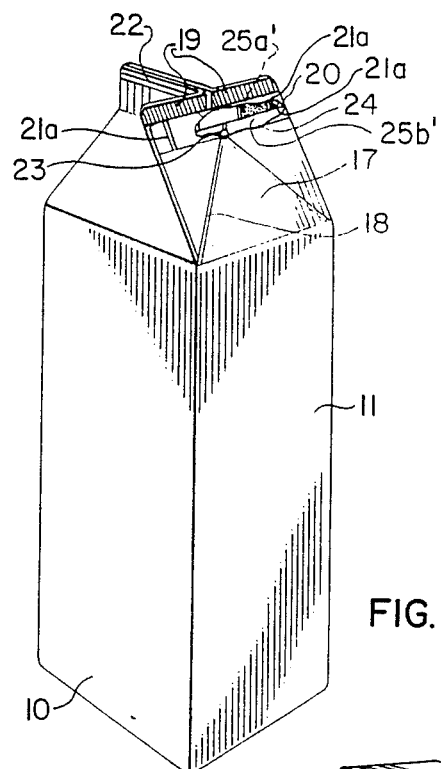
FIG. 5 is a perspective view of a gable top container in accordance with another embodiment of this invention illustrating the opening of the carton.

FIG. 5 of the drawings illustrates an improved structure which is similar to that illustrated in FIGS. 1 to 4 but shows an unsealed or lightly sealed area at the top of the flap 20 immediately above the stake point 23, substantially in the shape of a rectangle 25a' instead of the triangle of FIG. 2 and shows a further unsealed or lightly sealed area 25b' extending between stake point 23 and stake line 21a. The area 25b will therefore extend between stake lines 21a at each side of end flap 17 when the flaps 19 are separated to open the closure as shown in FIG. 5. The areas 25a' and 25b' are left unsealed or are lightly sealed by providing a die which applies no pressure or little pressure in these areas.

Figure 6:
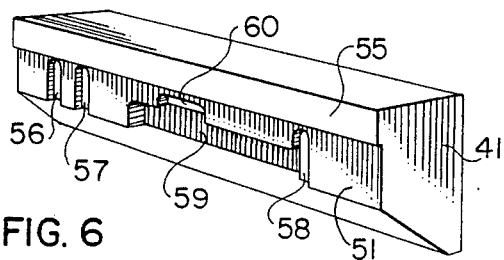
FIG. 6 is a perspective side elevation view of the female portion of a die for producing the embodiment of FIG. 5.
Figure 7:
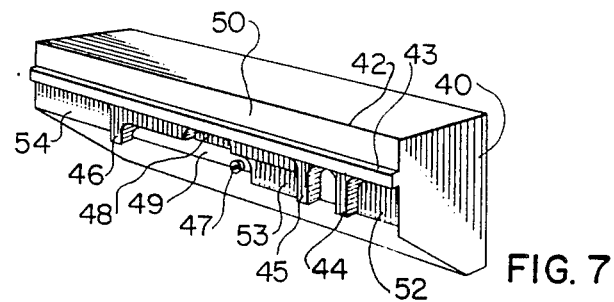
FIG. 7 is a perspective side elevation view of the male portion of a die for producing the embodiment of FIG. 5.

The construction of a suitable die as illustrated in FIG. 6 shows a female jaw 41. FIG. 7 shows a male jaw 40. Referring now to FIG. 7, the male jaw 40 has: a die face 42 having a raised longitudinal rib 43 to provide a horizontal stake line, vertical ribs 44 and 45 to provide stake lines on the side of the container that is to remain sealed and a vertical rib 46 to provide a stake line on the side of the container that is to be opened. The male jaw 40 has a set screw 47 to provide a central stake point 23. The generally rectangular relieved area 25a of FIG. 5 is provided by a depressed area 48 immediately above a set screw 47 and offset in the direction of the side of the carton that is to be opened. A relieved area 49, which creates the relieved area 25b' of FIG. 5, is also provided extending from the set screw 47 to the rib 46 which provides the stake line 21a. The male jaw 40 also includes an area 50 for sealing the top flaps 19 of the container and areas 52, 53 and 54 for sealing the remaining areas of flaps 19 and 20.

Female die 41 shown in FIG. 6 has an upper area 55 which mates with a portion 50 of the male jaw and a slightly undercut area 51, the upper edge of which is located to accommodate the rib 43. Die 41 has slots 56 and 57 to accommodate the ribs 44 and 45 and a slot 58 to accommodate the rib 46. It also has a depressed area 59 to relieve pressure, matching the area 49 of the male die and a generally rectangular pressure relieving area 60, matching the area 48 of the male die.

The embodiments of the invention in which an exclusive property or privilege is claimed are defined as follows:

1. A gable top carton the gable closure of which includes opposed side panels with side flaps extending therefrom and opposed end panels with end flaps extending therefrom to a lower height than the flaps of the side panels, said side panels and an end panel having score lines to facilitate closing and opening one end of the carton, the opposed side flaps being adhered to each other and the end flaps being adhered to the lower portions of the side flaps, leaving an area that is not firmly adhered at the center of the upper portion of said end flap, and a stake point immediately below the area which is not firmly adhered, to facilitate opening of the carton by a consumer.

2. A gable top carton as in claim 1, in which at least the interior of the carton is coated with a thermoplastic.

3. A gable top carton as in claim 2, in which the flaps are adhered by heat sealing.

4. A gable top carton as in claim 2, in which the area which is not firmly adhered is in the shape of an inverted triangle.

5. A gable top carton as in claim 1, in which the area which is not firmly adhered is in the shape of an inverted triangle at the apex of which there is the stake point.

6. A gable top carton as in claim 1, in which the area which is not firmly adhered is in the shape of an inverted triangle at the apex of which there is the stake point, and in which there is a horizontal stake line in the side flaps along the top of the end flaps that have been folded within the side flaps and vertical stake lines at each end of the side flaps.

7. A gable top carton as in claim 1, in which a further area which is not firmly adhered is provided in said end flap said further area which is not firmly adhered extending along the lower portion of said end flap from substantially the center to a point spaced from the outer edge.

8. A gable top carton as in claim 7 in which there is a horizontal stake line in the side flaps along the top of the end flaps, vertical stake lines adjacent each end of the side flaps and in which said further area which is not firmly adhered extends substantially from a central area where said stake point is located to the stake line in said end flap.

9. A gable top carton as in claim 7 in which there is a stake point below the unsealed or lightly sealed area, a horizontal stake line in the side flap along the top of the end flaps, and vertical stake lines adjacent each end of the side flaps.

10. A gable top carton as in claim 1 in which there is a horizontal stake line in the side flaps extending the full length of the side flaps and located at the top of the end flaps which have been folded within the side flaps.

11. A gable top carton as in claim 1, having liquid contents within said carton.

* * * * *